United States Patent [19]

Faivre

[11] Patent Number: 5,498,119
[45] Date of Patent: Mar. 12, 1996

[54] TURRET FOR MATERIALS TRANSPORT VEHICLES AND TELESCOPIC CONVEYOR MOUNTED THEREON

[76] Inventor: Jacques Faivre, 14, rue Octave-Voyer, F-85100 Les-Sables-d'Olonne, France

[21] Appl. No.: 211,441

[22] PCT Filed: Oct. 2, 1992

[86] PCT No.: PCT/FR92/00918

§ 371 Date: Apr. 7, 1994

§ 102(e) Date: Apr. 7, 1994

[87] PCT Pub. No.: WO93/01207

PCT Pub. Date: Apr. 15, 1993

[30] Foreign Application Priority Data

Oct. 8, 1991 [FR] France .................................. 91 12490

[51] Int. Cl.$^6$ .................................................. B60P 1/36
[52] U.S. Cl. ......................... 414/528; 212/231; 198/812; 198/313; 198/316.1; 198/317; 198/318; 414/503; 414/505
[58] Field of Search ................................. 414/503, 504, 414/505, 527, 528, 507, 523; 198/312, 313, 315, 316.1, 317, 318, 550.1, 511, 550.2, 560, 632, 804, 812, 861.4, 861.5, 861.6, 861.3; 212/187, 182, 223, 230, 231, 267, 232, 235, 238, 244, 261, 264, 268

[56] References Cited

U.S. PATENT DOCUMENTS

| | | | |
|---|---|---|---|
| 2,541,045 | 2/1951 | Ferwerda et al. .................... | 212/238 X |
| 2,815,849 | 12/1957 | Zumbrunnen ........................ | 198/313 X |
| 3,066,817 | 12/1962 | Bradshaw et al. ..................... | 414/505 |
| 3,471,034 | 10/1969 | Shinohara ............................. | 212/264 |
| 3,521,767 | 7/1970 | Rossi . | |
| 3,598,224 | 8/1971 | Oury ...................................... | 198/313 X |
| 3,825,107 | 7/1974 | Cary et al. ............................. | 198/313 |
| 3,945,484 | 3/1976 | Oury ...................................... | 198/812 X |
| 4,361,219 | 11/1982 | Aldridge et al. ...................... | 198/315 |
| 4,503,803 | 3/1985 | Barnes .................................. | 198/317 X |
| 4,523,669 | 6/1985 | Smith . | |
| 5,203,442 | 4/1993 | Oury et al. ............................ | 198/313 |

FOREIGN PATENT DOCUMENTS

| | | | |
|---|---|---|---|
| 1143321 | 3/1983 | Canada . | |
| 176335 | 4/1986 | European Pat. Off. .............. | 198/632 |
| 0424591 | 5/1991 | European Pat. Off. . | |
| 2332884 | 6/1977 | France . | |
| 1302135 | 1/1970 | Germany . | |
| 2184092 | 6/1987 | United Kingdom .................. | 212/238 |

OTHER PUBLICATIONS

International Search Report and Annex in French.
French Search Report and Annex.
International Preliminary Examination Report in French and English.

Primary Examiner—Frank E. Werner
Attorney, Agent, or Firm—Greenblum & Bernstein

[57] ABSTRACT

A turret deck for a telescopic conveyor comprises a platform which is longitudinally and translationally movable relative to the chassis of a vehicle on which it is supported. The platform supports a base plate and a supporting yoke on which the telescopic conveyor is pivotally mounted about a horizontal shaft. The conveyor is tilted by means of two hydraulic cylinders, one of which is located between the base plate and a second supporting yoke for placing the conveyor in a transport position, while the other cylinder tilts the conveyor to allow unloading. An additional hydraulic cylinder on the conveyor retracts automatically during operation of the first hydraulic cylinder in order to prevent the conveyor from interfering with obstacles or power lines while it is being placed in the transport position. The telescopic conveyor comprises devices for storing the lower band of the endless belt conveyor during the retraction of the various sections of the conveyor.

20 Claims, 2 Drawing Sheets

TURRET FOR MATERIALS TRANSPORT VEHICLES AND TELESCOPIC CONVEYOR MOUNTED THEREON

BACKGROUND OF THE INVENTION

1. Field of the Invention

The present invention relates to a turret deck for materials transport vehicles supporting a handling device and, more particularly, to a conveyor used as a transporting means and further relates to a telescopic type conveyor belt supportably mounted on such turret deck.

2. Description of Background Information

Transportation of materials of the cement mortar type is made on special purpose vehicles, the so-called truck mixers which, most of the time, include mortar conveyor means that convey the mortar directly to site.

Typically, mortar transportation is made by means of a belt conveyor of the endless belt type. This conveyor generally comprises several hinged sections whereby, among others, setting thereof into the transport position shall be performed while remaining within the carrying vehicle template. However, these conveyors extend over the at rear of the transport vehicle and offset from the longitudinal axis. Such arrangement is likely, in the course of time, to cause the chassis of the vehicle to endure twisting strain.

Furthermore, the length of such conveyor requires that handling, telescopic development or transport setting be made most cautiously in order to avoid striking of any of the power lines present around the site.

SUMMARY OF THE INVENTION

The present invention provides a turret deck and belt conveyor so constructed as, on one hand, to remedy the afore said drawbacks and, on the other hand, ensure increased safety on operation. The turret deck enables the conveyor to be suitably mounted on the chassis of the transport vehicle in such a way as to avoid warping of the chassis. Besides, the actuation means of the turret deck and conveyor are intended, upon development of the latter and setting thereof to the transport position, to suppress the usual risks incurred by the presence of power lines.

The turret deck in accordance with the invention comprises:

- a platform integral with the chassis of the vehicle;
- an orientation crown which is to be secured to the platform and is provided, onto the movable part thereof, with a base plate in the form of a supporting yoke that supports the conveyor by means of a horizontal pivotal shaft,
- means used to vary the conveyor tilting about the pivotal shaft thereof comprising, on one hand, a first cylinder which is interposed between the base plate and a second yoke hinged to the tilting shaft of the conveyor and, on the other hand, a second cylinder interposed between the second supporting yoke and the conveyor whereby two types of tilting are achieved: a tilting used to set the conveyor into the transport position and a tilting for positioning the conveyor at materials unloading step.

According to an additional arrangement of the invention, the turret deck comprises means used to retract or maintain the conveyor in a retracted position, particularly on actuation of the control cylinder which controls the tilting of transport setting.

Still according to the invention, the turret deck platform is made integral with the chassis of the vehicle by means of a frame which comprises a sliding rail whereby relative longitudinal motion of said platform with respect to the chassis by the action of an actuator is allowed in order to permit positioning at will of the conveyor under the materials chute.

According to another arrangement of the invention, the turret deck frame is mounted onto a rail which is transversally disposed at the rear of said vehicle by the action of an actuator.

Still according to the invention, the turret deck base plate is pivotally supported with respect to the platform along a vertical shaft by means of a chain sprocket system actuated by means of two cylinders, the rods thereof being integral respectively with the ends of said chain.

The invention also relates to the telescopic belt conveyor supported by the turret deck, which belt is guided between an upstream roller and a downstream roller and cooperates, at the lower belt thereof, with band storage means upon retraction of the conveyor. According to a preferred arrangement of the invention, the telescopic conveyor is comprised of several sections which are guided into each other as actuated by a control cylinder, each section comprising at the ends thereof guider rollers for guidance of the band lower belt.

According to another arrangement of the invention, the conveyor preferably comprises, at the end of the last telescopic section thereof, a materials orientating chute.

BRIEF DESCRIPTION OF THE DRAWINGS

The invention will be further detailed through the following description of an embodiment thereof, as well as through the appended drawings, which are given for illustration, and in which:

FIG. 3 shows a conveyor of a belt telescopic type conveyor into expanded position thereof.

DETAILED DESCRIPTION OF PREFERRED EMBODIMENTS OF THE INVENTION

Figure 1:
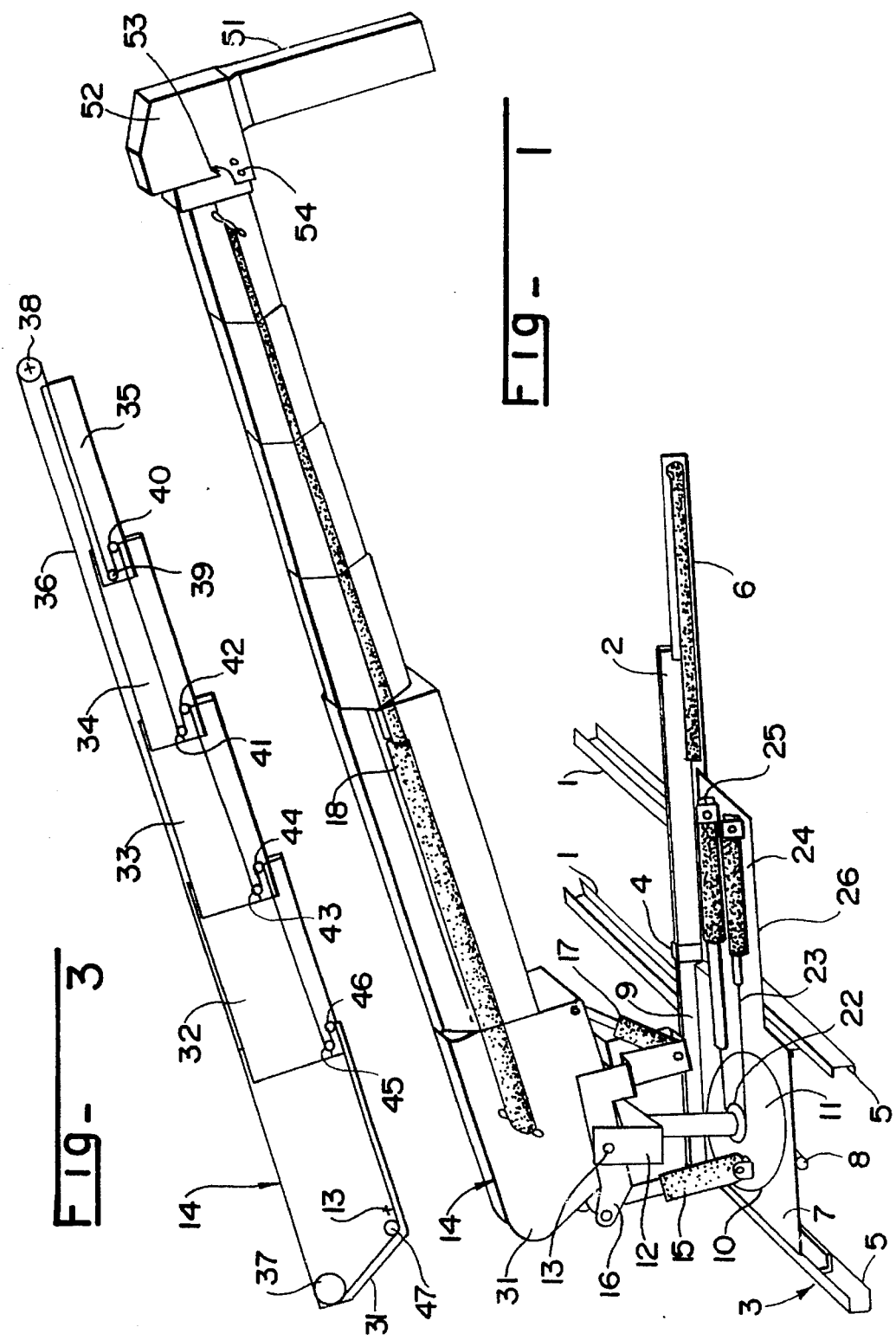
FIG. 1 is a perspective schematic view of a turret deck mounted onto a transport vehicle chassis with a belt telescopic conveyor.

As shown in FIG. 1, can be seen only the rear part of the chassis of a materials transport vehicle, not shown, which vehicle is for example a transport truck mortar mixer. The vehicle chassis 1 is comprised of two side bars, and to the end thereof is secured a transverse rail 2. This transverse rail extends substantially across the whole width of the vehicle. It accommodates a frame 3 suspended therefrom by means of hooks 4, which frame 3 comprises a sliding rail system 5 composed of two guides integral with structure thereof and, among others, hooks 4. These guides are arranged in the longitudinal direction from the rail 2. The frame 3 is transversally movable from the rear of the vehicle by means of an actuator 6 in the form of a cylinder interposed between the rail 2 and said frame 3.

The sliding rails 5 of frame 3 accommodate a longitudinally movable platform 7, at the rear of the vehicle, in the sliding rail system 5, by means of an actuator in the form of a cylinder 8 interposed between said platform and the structure 9 of the frame 3 which is interposed between both hooks 4. Longitudinal displacement of the platform 7 allows the conveyor positioning at will under the chute of the materials upon mixer draining, for example.

The platform 7 stands horizontally at the rear of the vehicle and comprises an orientation crown 10 centered on a vertical shaft in the mid-part thereof. The orientation crown 10 movable part comprises a base plate 11 and, the upper part thereof forms a supporting yoke 12. This supporting yoke is provided with the hinged shaft 13 that supports the conveyor 14. The hinged shaft 13 is horizontal and allows variation of the conveyor angle 14 thereby to permit setting thereof either in the loading position or in transport position.

The conveyor 14 tilting is performed by means of two cylinders. A first cylinder 15 is interposed between the base plate 11 and a supporting yoke 16 hinged to the tilting shaft 13, and a second cylinder 17 is interposed between said supporting yoke 16 and the conveyor 14.

The cylinder 17 is used for the materials unloading step and, in particular, for adjustment of the conveyor tilting within a range from approximately −10° to 20° on either part of a horizontal plane.

The cylinder 15 performs actuation of the conveyor 14 and, in particular, setting thereof to the transport position.

The cylinders 15 and 17 are disposed at either part of the supporting yoke 12 and they are affixed to the second yoke 16 on opposite sides of the tilting shaft 13. The cylinder 15 is located at the upstream end of the conveyor 14 and operation thereof depends on the state of the cylinder 18 used for said conveyor 14 expansion. The cylinder 18 and the conveyor 14 are either retracted, or so maintained, upon actuation of the cylinder 15 for transport position setting. As a matter of fact, the feed hydraulic circuit of the different cylinders is divided into two circuits, which are activated by an inverter. A first circuit allows actuation of the conveyor 14 by enabling operation of the actuation cylinders and, ultimately, of the expansion cylinder 18. A second circuit corresponds to the transport position setting and requires, prior to any other operation, retraction of the cylinder 18 of the conveyor 14, thereby reducing overall dimensions thereof and hence avoiding interferences with power lines or the like.

Figure 2:
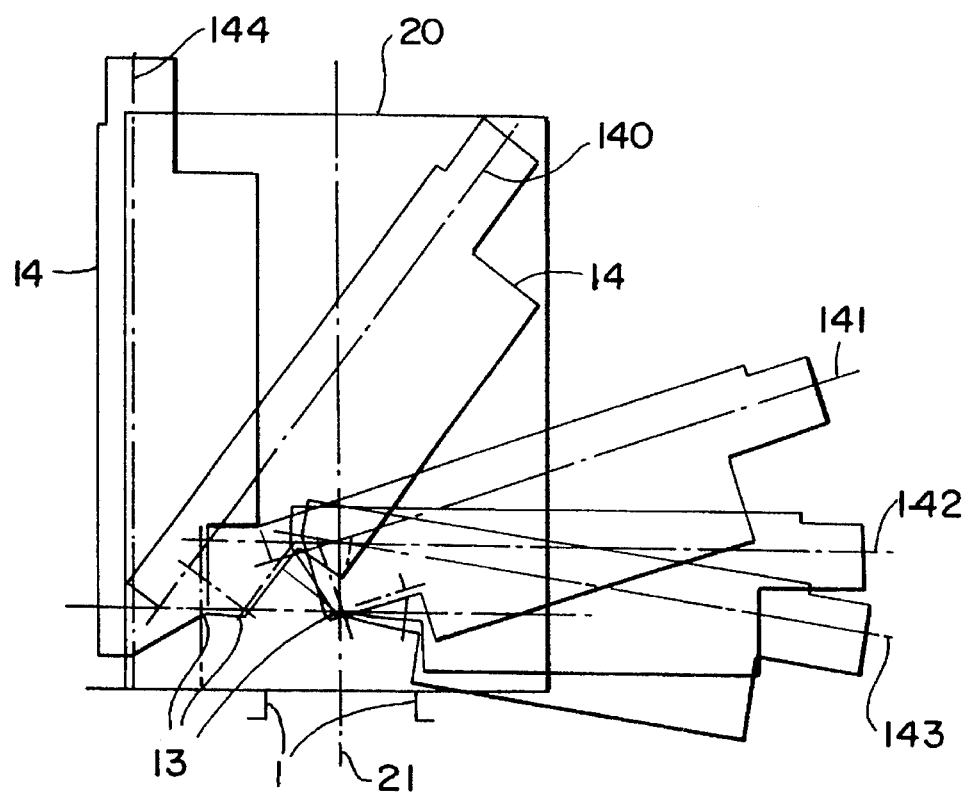
FIG. 2 illustrates a scheme of the various positions taken by the telescopic conveyor with respect to the vehicle chassis upon materials unloading and setting thereof to the transport position.

The different conveyor 14 positions are illustrated in the schematic diagram of FIG. 2. In FIG. 2, is to be seen the chassis 1 of the transport vehicle as well as the template thereof, as shown by the outline 20. In the transport position, the conveyor 14 shall be wholly enclosed in the outline 20. It occupies the position 140. It shall be noted that, in this position, the tilting shaft 13 is offset to the left from the vehicle mid-plane 21. Such offset of the shaft 13 is achieved through the translation movement that is performed by the frame 3 onto the rail 2 by the action of the actuation cylinder 6.

As regards unloading, the conveyor 14 will take either of tiltings 141, 142 or 143 such as shown in FIG. 2, i.e. either a position 141 upward tilted with a 20° maximal angle from the horizontal position 142, or a downward tilted position from an angle approximately −10° from the horizontal plane. The tilting shaft 13 is shown centered to the mid-plane 21. It may, depending on the materials arrival, be transversely displaced by the action of the actuation cylinder 6 with respect to the vertical mid-plane 21.

Still in FIG. 2, it shall be noted that the conveyor 14 may particularly be vertically positioned also as shown in 144, either to a side of the vehicle or to the center by the tilting shaft 13 displacement, whereby to avoid any warpage of the chassis 1, upon transportation particularly.

The conveyor 14 orientation is achieved through the base plate 11 pivotal movement about the vertical shaft thereof. This pivotal movement is achieved by means of a sprocket 22 cooperating with a chain 23, which chain is movable by the action of two actuation cylinders 24 and 25, to which it is connected by its two ends, at the respective rods of said cylinders. These cylinders 24 and 25 are mounted onto the platform 7 as protruding from a lateral projection 26 as by shown in FIG. 1.

The conveyor 14 is one of the telescopic type. It comprises a cylinder 18 to ensure extension or retraction thereof.

Upon actuation such as telescopic development or transport setting actuation, a safety device actuates the cylinder 18 thereby operating overall retraction of the conveyor 14, prior to setting the different actuation cylinders to work, particularly the cylinder 15 that places the conveyor 14 through the transport position, as shown in FIG. 2, in either of positions 140 or 144. This safety device allows the risks of interfering with the power lines, for example, to be reduced or even cancelled. Similarly, the cylinder 18 is maintained retracted prior to any actuation of the different actuation cylinders and, particularly, of the cylinder 15, aiming at setting the conveyor 14 to the unloading condition.

Figure 4:
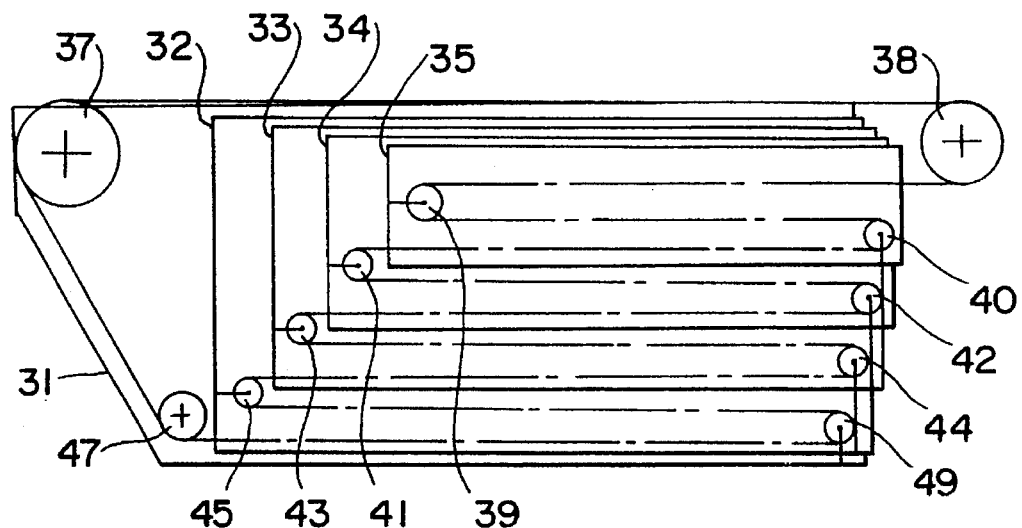
FIG. 4 shows the same conveyor in the retracted position.

As shown in FIGS. 3 and 4, a telescopic conveyor of the belt type that comprises a band wherein the lower belt thereof cooperates with means ensuring storage thereof upon retraction operations and its release upon expansion of the telescopic conveyor.

It can be noted that this conveyor 14 is comprised of a first section 31 which is integral with the turret deck and, in particular, hinged to the tilting shaft 13. This first section 31 is supporting a second section 32. The section 32 is supporting a section 33, itself supporting a section 34 and the latter supports the end section 35. As shown in FIG. 1, the cylinder 18 is interposed between the first section 31 and last section 35. A belt 36, in the form of an endless belt, extends between the upstream roller 37, which is guided within the first section 31, and the downstream roller 38 which is guided at the end of the section 35. The conveyor belt 36 upper belt is running above the sections 31–35. The conveyor belt 36 lower belt is wounded around rollers that are disposed to the inner end and outer end of the sections 31–35. Hence, can it be noted that the lower belt is running, from the downstream roller 38, onto a roller 39 which is integral with the inner end of the section 35, and then is wound around a roller 40 disposed to the outer end of the section 34. Then, the lower belt advances onto a roller 41 disposed to the inner end of the section 34 to be next wound around a roller 42 disposed to the outer end of the section 33. Similarly, is to be found a roller 43 to the inner end of the section 33 and a roller 44 disposed to the outer end of the section 32, then a roller 45 disposed to the inner end of the section 32 and a roller 46 disposed to the outer end of the first section 31. A complementary roller 47 is interposed to the lower end of the section 31 between the roller 46 and the downstream roller 37. The conveyor belt 36 lower belt is automatically stored by means of the rollers 39–46 upon the conveyor 14 retraction and develops telescopically anew upon extension of the conveyor by the action of the cylinder 18.

There is shown, in FIG. 4, the conveyor 14 in the retracted position as showing the conveyor belt 36 inferior belt stored by means of the winding rollers 39–47 inside the first section 31.

There is also shown in FIG. 1 a chute 50 which is formed to the downstream end of the conveyor 14. This chute comprises a head 52 hinged about a shaft 53 at the end of the conveyor, which shaft 53 is parallel to the tilting shaft 13. A number of holes 54 are provided for adjustment of the chute 51 orientation according to need.

The reference numerals inserted after the technical features mentioned in the claims are only intended to facilitate understanding of the latter and in no way to limit the scope thereof.

I claim:

1. A turret deck for securing a telescopically extendible conveyor to a chassis of a materials transport vehicle, said turret deck being moveable from a transport position to at least one materials unloading position, said turret deck comprising:

a platform, adapted to be integral with the chassis of the vehicle;

an orientation crown mounted on said platform, said orientation crown comprising an upper part and a lower part;

said lower part comprising a base plate moveable with respect to said platform;

said upper part comprising a first supporting yoke for pivotally supporting the conveyor on a tilting shaft;

a second yoke journaled to said tilting shaft;

a first actuation element interposed between said base plate and said second yoke, said first actuation element being connected to said second yoke at a first side of said tilting shaft, and a second actuation element interposed between said second yoke and said conveyor, said second actuation element being connected to said second yoke at a second side of said tilting shaft; and said base plate, said first and second supporting yokes and said first and second actuation elements being constructed and arranged to impart first and second types of tilting to said conveyor, said first type of tilting comprising movement of said conveyor into the transport position, and said second type of tilting comprising movement of said conveyor into the at least one material unloading position.

2. The turret deck of claim 1, wherein said conveyor is moveable from an extended position to a retracted position, and said conveyor further comprises an actuator for moving said conveyor between said extended position and said retracted position and for retaining said conveyor in said retracted position when said conveyor is moved into said transport position.

3. The turret deck of claim 2, wherein said actuator comprises a hydraulic cylinder.

4. The turret deck of claim 1, further comprising a platform integral with said chassis, said platform further comprising a frame which comprises a sliding rail system, said sliding rail system being constructed and arranged to allow longitudinal movement of said conveyor with respect to said chassis in response to an actuation element.

5. The turret deck of claim 4, wherein said chassis further comprises a rail which is transversely disposed and integral with said chassis and wherein said frame is moveable with respect to said chassis in response to an actuation element.

6. The turret deck of claim 5, wherein said actuator comprises a hydraulic cylinder.

7. The turret deck of claim 4, wherein said actuator comprises a hydraulic cylinder.

8. The turret deck of claim 1, wherein said base plate is pivotable with respect to said platform about a vertical axis;

said base plate further comprising a sprocket engaged by a chain;

said chain having first and second ends, said first end being secured to a first actuator having a moveable rod to which said first end is secured, said second end being secured to a second actuator having a moveable rod to which said second end is secured;

said sprocket, chain and actuators being constructed and arranged to pivot said base plate with respect to said platform.

9. The turret deck of claim 8, wherein each of said first and second actuators comprise a hydraulic cylinder.

10. The turret deck of claim 1, wherein said conveyor is moveable from an extended position to a retracted position, and comprises an endless conveyor belt, comprising an upper band and a lower band, guided between an upstream roller and a downstream roller; and said conveyor further comprises means for storing said lower band within said conveyor when the conveyor is moved to said retracted position.

11. The turret deck of claim 10, wherein said conveyor comprises a plurality of telescoping sections, each having a first end and a second end, each of said first ends and said second ends of said sections comprising at least one roller, constructed and arranged to store said lower band when the conveyor is moved to said retracted position.

12. The turret deck of claim 1, wherein said conveyor comprises a downstream end which comprises an orientation chute supported by a pivotal head hinged about a shaft, said shaft being parallel to said horizontal shaft of said generally U-shaped yokes.

13. The turret deck of claim 12, wherein said pivotal head can be locked in at least one of a plurality of selectable positions.

14. The turret deck of claim 1, wherein said first and second actuation elements comprise hydraulic cylinders.

15. The turret deck of claim 1, wherein said conveyor is moveable between said plurality of material unloading positions in response to said second actuation element.

16. The turret deck of claim 15, wherein said material unloading positions are located within a range of from approximately −10° to +20° from horizontal.

17. The turret deck of claim 1 in combination with said telescopically extendible conveyor, said conveyor comprising:

an upstream roller;

a downstream roller; and an endless conveyor belt, including an upper band and a lower band, guided between said upstream roller and said downstream roller, and means for storing said lower band within the conveyor when the conveyor is moved to a retracted position.

18. The turret deck and conveyor of claim 17, said conveyor further comprising a plurality of telescoping sections, each having a first end and a second end, and said means for storing said lower band comprising at least one roller, in each of said first and second ends, constructed and arranged to store said lower band when the conveyor is moved to the retracted position.

19. The turret deck and conveyor of claim 18, wherein said conveyor is moveable from an extended position to the retracted position, and said conveyor further comprises a hydraulic cylinder for moving said conveyor between the extended position and the retracted position and for retaining said conveyor in said retracted position when said conveyor is moved into a transport position.

20. The turret deck and conveyor of claim 17, said conveyor further comprising a downstream end comprising an orientation chute supported by a pivotal head hinged about a shaft, said pivotal head being adapted to be locked in at least one of a plurality of positions.

* * * * *

UNITED STATES PATENT AND TRADEMARK OFFICE
CERTIFICATE OF CORRECTION

PATENT NO. : 5,498,119
DATED : March 12, 1996
INVENTOR(S) : Jacques Faivre

It is certified that error appears in the above-indentified patent and that said Letters Patent is hereby corrected as shown below:

At column 1, line 23, delete "at".

At column 2, line 51, change "can be seen only" to -- -what can be seen is only---.

At column 5, lines 7 through 10 should be deleted in their entirety.

At column 5, line 64 (claim 6, line 1). change "actuator" to ---actuation element---.

At column 5, line 66 (claim 7, line 1). change "actuator" to ---actuation element---.

Signed and Sealed this

Seventeenth Day of September, 1996

*Attest:*

BRUCE LEHMAN

*Attesting Officer*   *Commissioner of Patents and Trademarks*